Sept. 23, 1952   F. P. E. QUICK   2,611,339
POULTRY FEEDER
Filed Jan. 6, 1950   2 SHEETS—SHEET 1
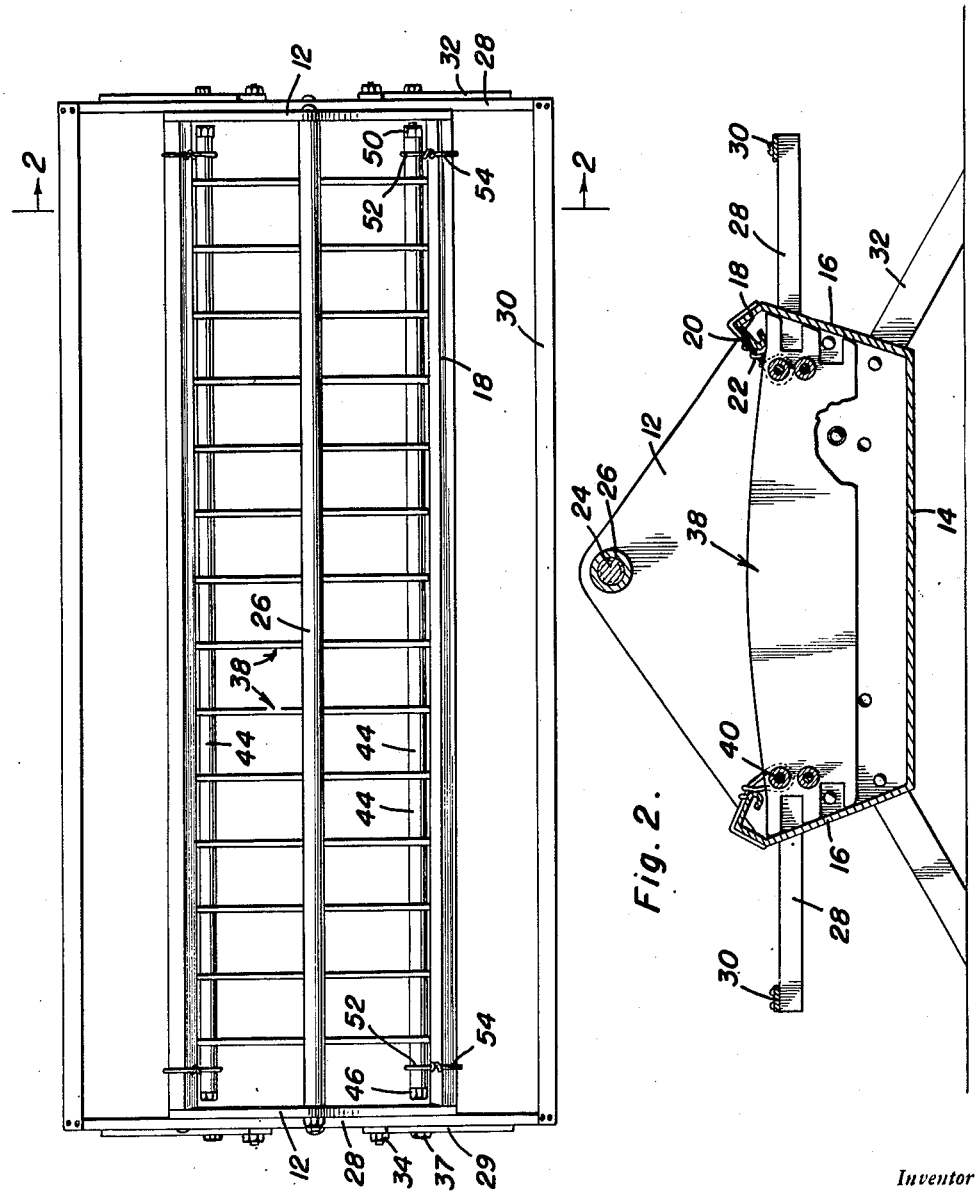
Inventor
Frank P. E. Quick
By *Clarence A. O'Brien and Harvey B. Jacobson*
Attorneys Sept. 23, 1952     F. P. E. QUICK     2,611,339
POULTRY FEEDER
Filed Jan. 6, 1950     2 SHEETS—SHEET 2
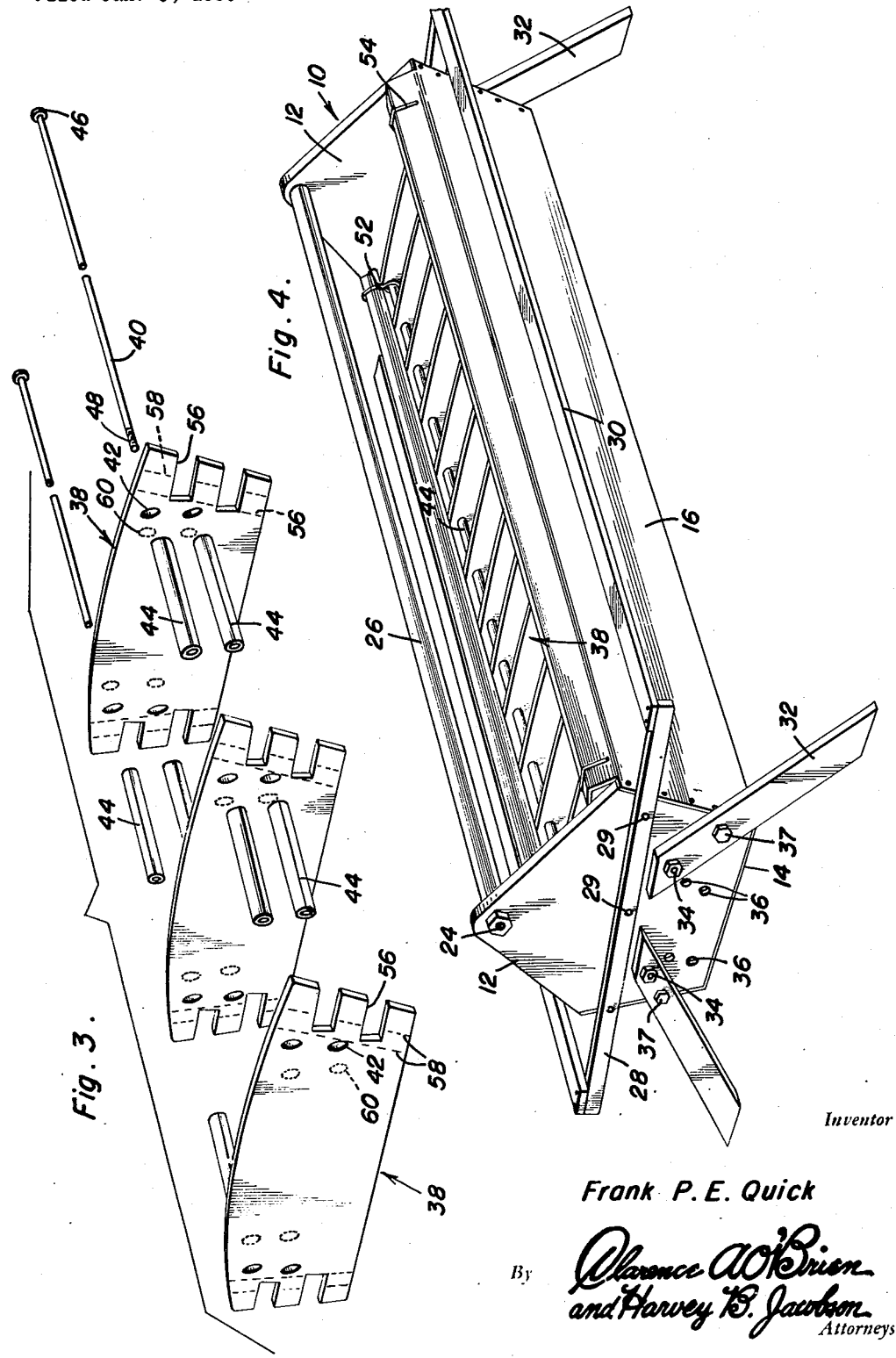
Inventor
Frank P. E. Quick
By Clarence A. O'Brien
and Harvey B. Jacobson
Attorneys Patented Sept. 23, 1952

2,611,339

UNITED STATES PATENT OFFICE 2,611,339

POULTRY FEEDER

Frank P. E. Quick, North Plainfield, N. J.

Application January 6, 1950, Serial No. 137,207

7 Claims. (Cl. 119—61)

This invention relates to poultry feeders generally, and more particularly to a poultry feeder having improved means for preventing the waste of feed.

The primary object of this invention is to provide a poultry feeder from which it will be impossible for poultry to toss feed while eating therefrom.

Another important object of this invention is to provide means which may be readily attached to extant poultry feeding boxes for preventing the loss of feed therefrom.

Another important object of this invention is to provide a poultry feeder which denies poultry from getting into the feeder to contaminate the feed with their feet, or permit droppings to get into the feed to otherwise contaminate the same.

Still another important object of this invention is to provide a poultry feeder that is adjustable for various kinds and ages of poultry.

A meritorious feature of the present invention resides in the provision of a plurality of vertical guard plates, the purpose of which is to prevent feed from being tossed from the feeder due to the natural propensity of poultry for lateral movement of heads during feeding.

Another important feature of the present invention resides in the particular construction of the guard plates, which includes provision for making the same adaptable for various sizes of feeders, and the means by which the plates are secured to and supported by the end walls of the feeder in spaced relation above the bottom of the feeder, with the same retained in spaced, parallel relationship.

Another important feature of the present invention resides in the top roller, and the upper portions of the side walls being inturned to form guard rails, which, together with the means for supporting the plates, tend to prevent poultry from getting into the feeder.

A final meritorious feature to be specifically enumerated herein resides in the simplicity of construction and the relatively low cost of manufacture of this poultry feeder, and the durability and efficiency of the same for the purposes intended.

These, together with various ancillary features and objects of the invention which will later become apparent as the following description proceeds, are attained by the present invention, a preferred embodiment of which has been illustrated by way of example only in the accompanying drawings, wherein:

Figure 1 is a top plan view of the present invention;

Figure 2 is a vertical transverse sectional view of the invention with a portion of a guard plate being broken away and is taken substantially upon the plane of the section line 2—2 of Figure 1;

Figure 3 is an exploded perspective view of the guard plate and the means for securing the same to the end walls of the poultry feeder; and Figure 4 is a perspective view of the poultry feeder.

Reference is now made more specifically to the accompanying drawings, wherein like numerals designate similar parts throughout the various views, and in which the poultry feeder is designated generally by the numeral 10.

The feeder 10 comprises a pair of pentagonal end walls 12, which are connected by a bottom wall 14 and side walls 16, preferably formed from a single sheet of material. The side walls 16 are upwardly divergent and adjacent their upper edge are bent upwardly and inwardly, thence inwardly and downwardly as at 18 and 20, respectively, and terminate in a rolled bead 22, the upper portion of the side walls 16 being thus formed for the twofold purpose of preventing poultry from positioning themselves thereon and to constitute a guard rail for preventing the loss of feed from the trough defined by the bottom wall 14 and the side walls 16.

Adjacent the upper apices of the end walls 12, a rod 24 joins the end walls 12 upon which a tubular roller 26 is journaled for the purpose of making it impossible for poultry to perch thereon. Means is provided affording perching positions for poultry during feeding, which include cross bars 28 secured as at 29 to the end walls 12, the outer ends of which are connected on opposite sides of the trough by perch bars 30. It will be understood that the perch bars 30 are so positioned relative to the trough that poultry perched thereon may conveniently feed from the trough. Legs 32 are provided for the feeder 10, which are adjustably secured to the end walls 12 by means of a bolt 34 which is selectively positioned in a selected aperture 36 in the end walls 12 for adjustably varying height of the feeder 10 above the ground, with the legs 32 pivoting about a fastener 37 connecting the legs and end walls between adjusted positions.

Means is provided to restrict the poultry to narrow eating spaces which are centrally located in the trough, which comprises a plurality of spaced vertical guard plates indicated generally by the numeral 38. The guard plates 38 are substantially trapezoidal in shape to conform to the sloping side walls 16. The plates 38 are retained in horizontally spaced, vertical and parallel relationship above the bottom wall 14 by means of tie rods 40 extending through apertures 42 in the plates, it being noted that in the preferred construction two tie rods are provided at each side of the plates 38. The plates 38 are retained in spaced relationship by means of tubular spacers 44 being disposed on the tie rods 40 between the plates 38, and the grid assembly formed of the plates 38, tie rods 40, and spacers are retained in unitary relationship by one end of each of the tie rods, being enlarged 46 and the other end threaded 48 and provided with a retaining nut 50. Obviously, spacers 44 of various lengths may be provided so that the spacing between plates 38 may conform to the size of poultry using the feeder. It will be also evident that the tie rods 40 and spacers 44, since they are disposed adjacent to the side edges of the plates 38, will confine the poultry to eating out of the center of the trough.

Although the grid assembly may normally be supported by the plates 38 engaging the sloping side walls 16, in the preferred construction, heavy wire 52 is secured to spacers 44 adjacent opposite extremities of the tie rods, as best shown in Figure 4, which wires may be adjustably bent as at 54 to engage the upper portion of the side walls so that the grid assembly may be adjustably supported relative to the bottom wall 14.

Notches 56, see Figure 3, are provided in the side edges of the plates 38 to provide communication between opposite sides of the plates 38, while communication is provided also between the plates by the same being spaced above the bottom wall 14 for the proper distribution of feed between the various plates 38, as will be readily understood.

To make the plates 38 readily adaptable to feeders of various size, score lines 58 are provided adjacent the side edges of the plates 38, whereby the plates 38 may be readily bent or broken off to conform with the dimensions of various sizes of feeders, and score lines 60 define knock-out openings, should it be desired to space the tie rods 40 closer together, in which case the apertures 42 would tend to serve the function of affording communication between opposite sides of the plates 38 in a manner analogous to that of the notches 46.

From the foregoing, the construction and operation of the device will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A poultry feeder, comprising a pair of pentagonal end walls, a roller rotatably supported by and connecting the upper apices of the end walls, a trough connecting the end walls, including a bottom wall and upwardly diverging side walls, the upper portion of said side walls being bent upwardly and inwardly thence downwardly and inwardly and terminating in a rolled bead, a plurality of substantially trapezoidal plates in said trough, said plates being disposed vertically and above the bottom wall and in parallel relation to each other, tie rods extending through said plates and supporting the plates, and tubular spacers on the tie rods between adjacent plates retaining the same in parallel relation.

2. The combination of claim 1 including legs adjustably secured to the end walls, and a pair of perch bars supported by the end walls and disposed on opposite sides of said trough.

3. In a poultry feeder having an elongated trough and end walls closing the opposite ends of the trough, a feed control structure comprising a plurality of longitudinally spaced, transversely disposed vertical plates arranged in said trough, said plates being spaced from the bottom of said trough and in substantial contact with the sides of said trough, said plates having longitudinally aligned openings adjacent each end thereof, a tie rod extending through each set of aligned openings in said plates, said rods being arranged in spaced relation to the side edges of said trough, spacers mounted on the tie rods intermediate said plates and engaging the sides thereof to maintain a predetermined spacing between said plates, means at the opposite ends of the tie rods for maintaining said spacers and said plates in assembled relation on said rods, and means engaging said structure and said trough for supporting said structure in said trough.

4. In a poultry feeder having an elongated trough and end walls closing the opposite ends of the trough, a feed control unit comprising a plurality of longitudinally spaced, transversely disposed vertical plates disposed in the trough, the bottom edges of the plates being spaced above the bottom of the trough and the opposite end edges of the plates being conformable to the sides of the trough and disposed immediately adjacent thereto, said plates having a plurality of longitudinally aligned openings inwardly spaced from each end thereof, a tie rod extending through each set of said aligned openings, said tie rods being spaced from and below the edges of the trough, and tubular spacers disposed on the tie rod intermediate the plates with the opposite ends of each of the spacers abutting adjacent plates to maintain a predetermined spacing between said plates, and means removably supporting the tie rod on the trough.

5. In a poultry feeder having an elongated trough with inturned side edges and end walls closing the opposite ends of the trough, a feed control structure comprising a plurality of longitudinally spaced, transversely disposed vertical plates disposed in the trough, the bottom edges of the plates being spaced above the bottom of the trough and the opposite end edges of the plates being conformable to the sides of the trough and disposed immediately adjacent thereto, said plates having a plurality of longitudinally aligned openings arranged transversely of the trough, a tie rod extending through each set of said aligned openings in said plates, and spacers disposed on the tie rod intermediate the plates with the opposite ends of each of the spacers abutting adjacent plates, means at the opposite ends of the tie rods for retaining the spacers on the tie rods, and means engaging said structure and said trough for removably supporting the tie rods on the sides of the trough, said tie rods extending parallel to said inturned side edges and being spaced inwardly from and below said edges.

6. In a poultry feeder having an elongated trough and end walls closing the opposite ends of the trough, a plurality of longitudinally spaced, transversely disposed vertical plates disposed in the trough, the bottom edges of the plates being spaced from the bottom of said trough and the opposite end edges of the plates being conformable to the sides of the trough and disposed in substantial contact with said sides, each of said plates having notches in its opposite ends, said plates having a plurality of longitudinally aligned openings adjacent each end thereof, said openings being arranged in increasing spaced relation to the sides of the trough, a tie rod extending through each set of said aligned openings in said plates, and tubular spacers disposed on each tie rod intermediate the plates with the opposite ends of each of the spacers abutting adjacent plates, and means removably supporting the tie rod on the trough.

7. In a poultry feeder having an elongated trough and end walls closing the opposite ends of the trough, an attachment comprising a plurality of longitudinally spaced, transversely disposed vertical plates disposed in the trough, the bottom edges of the plates being spaced above the bottom of the trough and the opposite end edges of the plates being conformable to the sides of the trough and disposed immediately adjacent thereto, each of said plates having score lines inwardly spaced from and generally parallel to its opposite end edges, said plates having a plurality of longitudinally aligned openings, a tie rod selectively extending through each set of said longitudinally aligned openings, and tubular spacers disposed on each tie rod intermediate the plates with the opposite ends of each of the spacers abutting adjacent plates, and means removably supporting the tie rod on the trough.

FRANK P. E. QUICK.

REFERENCES CITED

The following references are of record in the file of this patent:

UNITED STATES PATENTS

| Number | Name | Date |
| --- | --- | --- |
| 1,172,913 | Slater | Feb. 22, 1916 |
| 1,794,589 | Collins | Mar. 3, 1931 |
| 1,889,469 | Gardiner | Nov. 29, 1932 |
| 1,997,029 | Abendroth | Apr. 9, 1935 |
| 2,213,416 | Slawson | Sept. 3, 1940 |
| 2,330,295 | Lindquist | Sept. 28, 1943 |
| 2,498,981 | Darby | Feb. 28, 1950 |